(12) United States Patent
Rho et al.

(10) Patent No.: US 8,576,358 B2
(45) Date of Patent: Nov. 5, 2013

(54) DISPLAY DEVICE HAVING POLARIZING LAYER AND MANUFACTURING METHOD OF THE SAME

(75) Inventors: Soon-Joon Rho, Suwon-si (KR);
Baek-Kyun Jeon, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 757 days.

(21) Appl. No.: 12/788,898

(22) Filed: May 27, 2010

(65) Prior Publication Data
US 2010/0309415 A1      Dec. 9, 2010

(30) Foreign Application Priority Data

Jun. 4, 2009   (KR) .................. 10-2009-0049446

(51) Int. Cl.
*G02F 1/1335*    (2006.01)
*G02F 1/1337*    (2006.01)

(52) U.S. Cl.
USPC ............. 349/96; 349/124; 349/136; 349/183; 349/187

(58) Field of Classification Search
USPC ........... 349/96, 124, 165, 183, 187, 191, 136; 359/487.02, 487.06; 252/299.01, 252/299.1; 428/1.31; 430/321
See application file for complete search history.

(56) References Cited

U.S. PATENT DOCUMENTS

| | | | |
|---|---|---|---|
| 6,245,399 B1 | 6/2001 | Sahouani et al. | |
| 2005/0276566 A1* | 12/2005 | Iimura | 385/146 |
| 2007/0024970 A1 | 2/2007 | Lub et al. | |

FOREIGN PATENT DOCUMENTS

| | | | |
|---|---|---|---|
| JP | 2001-330719 | 11/2001 | |
| JP | 2001-330726 | 11/2001 | |
| JP | 2003-021720 | 1/2003 | |
| JP | 2006-309185 | 11/2006 | |
| KR | 1019990016174 | 3/1999 | |
| KR | 1020020036311 | 5/2002 | |
| KR | 100388229 | 6/2003 | |
| KR | 1020070003500 | 1/2007 | |
| KR | 1020080023307 | 3/2008 | |
| WO | WO 2007/000705 | * | 1/2007 |

* cited by examiner

*Primary Examiner* — Dung Nguyen
*Assistant Examiner* — Tai Duong
(74) *Attorney, Agent, or Firm* — F. Chau & Associates, LLC

(57) ABSTRACT

The present invention relates to a polarization layer for an LCD and a manufacturing method thereof that improve light transmittance and polarization performance of a polarization layer by controlling a pre-tilt angle of an alignment layer. The manufacturing method of the present invention includes forming an alignment layer treated by inorganic alignment, forming a liquid crystal mixture including a dichroic dye, a liquid crystal monomer, a photo-initiator, and a gelator on the alignment layer, irradiating light to the liquid crystal mixture for photo-polymerizing it, and forming a color filter (CF) or a thin film transistor (TFT) on the polymerized and solidified liquid crystal mixture. Accordingly, the polarization layer manufactured by the present invention has the high light transmittance thereby increasing the polarization efficiency and realizing the liquid crystal display of high quality compared with the conventional polarization layer by the rubbing alignment.

20 Claims, 7 Drawing Sheets

LC coating & HT
(Isotropic State)

Cooling
(N or $S_A$ state)

DISPLAY DEVICE HAVING POLARIZING LAYER AND MANUFACTURING METHOD OF THE SAME

CROSS-REFERENCE TO RELATED APPLICATION

This application claims priority to and the benefit of Korean Patent Application No. 10-2009-0049446 filed on Jun. 4, 2009, the entire disclosure of which is hereby incorporated by reference herein in it's entirety.

BACKGROUND OF THE INVENTION (a) Technical Field

The present disclosure relates to a manufacturing method for a polarization layer applied to a liquid crystal display, and particularly relates to a manufacturing method of a polarization layer for a liquid crystal display (LCD) with significantly improved light transmittance and polarization performance by lowering a pre-tilt angle.

(b) Description of the Related Art

A polarization layer for an LCD that is commercially available may be manufactured by absorbing an iodine or dichroic dye to a polyvinyl alcohol (PVA) film and stretching the PVA film in a predetermined direction, and the polarization layer may absorb a light oscillating in one direction and transmit a light oscillating in a different directions, thereby forming linear polarization. However, it may be difficult to obtain efficiency of the polarization layer of more than 50%. Also, the PVA is a water-soluble polymer such that water resistance and thermal resistance thereof may be decreased, and as a result the durability of the polarization layer may be poor, the mechanical strength for a transmissive axis direction may be weak, and the polarization layer may be contracted by heat or moisture such that the drawback of the polarization function being significantly decreased may occur.

Accordingly, an improved method for manufacturing a polarization layer with a simpler manufacturing process and an improved polarization efficiency, and a new polarization layer material is required. Accordingly, an incell-POL technique has recently been proposed for answering this requirement. There is a guest-host type in the incell-POL (ICP) technique. It is disclosed that the characteristics of this case are similar to the average value of the PVA polarizer in Advanced Material 2006 2412. In the guest-host type, a horizontal alignment layer is formed on and under an insulation substrate for the ICP, the horizontal alignment layer is subjected to a rubbing surface treatment, a spacer is formed between the upper and lower substrates, and two substrates are combined, and then a guest-host liquid crystal is filled between the two substrates. Liquid crystal molecules as the host that are filled in the substrates are uniformly arranged according to the alignment angle of the surface by the rubbing, and then ultraviolet rays (365 nm, 30 m) are irradiated to the surface of one side such that the dye as the guest is fixed.

Here, the polarization of the polarization layer is obtained through the effect of the dye absorbing light.

However, the rubbing treatment for the alignment layer of the ICP may generate a pre-tilt angle of more than two degrees on the surface of the alignment layer such that the polarization layer that is manufactured through this process may have low light transmittance, thereby decreasing the polarization efficiency.

Thus, there is a need in the art for a polarization layer with improved light transmittance and polarization performance.

SUMMARY OF THE INVENTION

An aspect of the present invention may reduce the pre-tilt of an alignment layer included in a polarization layer to increase polarization efficiency.

To manufacture a polarization layer for a display device according to an aspect of the present invention, an alignment layer is formed of an inorganic alignment layer or a photo-alignment layer and a pre-tilt is formed in the surface thereof through ion beam or plasma alignment, and photo-alignment with a low pre-tilt of less than about 2 degrees may be formed compared with conventional rubbing. Also, the liquid crystal mixture includes a gelator such that the liquid crystal mixture that is arranged on the alignment layer is polymerized and solidified at a position thereof. Accordingly, the incell-POL may be readily formed according to the present invention, the light transmittance of the polarization layer due to the low pre-tilt may be increased, and thereby the polarization efficiency of the entire polarization layer may be increased.

According to an aspect of the present invention, the polarization layer manufactured by the process according to an exemplary embodiment of the present invention has improved polarization efficiency, and an attaching process of the polarizer may be omitted when manufacturing a liquid crystal panel. Accordingly, the polarization layer manufactured according to the present invention may realize a liquid crystal display with high quality.

In accordance with an exemplary embodiment of the present invention, a method for manufacturing a liquid crystal display is provided. The method includes providing a first insulation substrate, forming a thin film transistor on the first insulation substrate, forming a first substrate on the thin film transistor, forming a first alignment layer on the first substrate, coating a dichroic pigment, a liquid crystal mixture, a photo-initiator, and a gelator on the first alignment layer, sequentially applying a high temperature and a low temperature to the liquid crystal mixture to arrange the liquid crystal on the first alignment layer and solidifying the arranged liquid crystal mixture through polymerization by the gelator to form a first polarization layer.

In accordance with another exemplary embodiment of the present invention, a liquid crystal display is provided. The liquid crystal display includes a first insulation substrate, a thin film transistor formed on the first insulation substrate, a first substrate formed on the thin film transistor, a first alignment layer formed on the first substrate; and a first polarization layer formed on the first alignment layer. The first polarization layer including a dichroic pigment and a photo-hardener and a cross-linked liquid crystal mixture and a gelator polymerized in a predetermined arrangement.

In accordance with another exemplary embodiment of the present invention, a method for manufacturing a liquid crystal display is provided. The method includes providing a first insulation substrate, forming one of a thin film transistor or a color filter on the first insulation substrate, forming a first substrate on the one of the thin film transistor or the color filter formed on the first insulation substrate, forming a first alignment layer on the first substrate, coating a dichroic pigment, a liquid crystal mixture, a photo-initiator, and a gelator on the first alignment layer, applying a high temperature and a low temperature to the liquid crystal mixture to arrange the liquid crystal on the first alignment layer and solidifying the arranged liquid crystal mixture through polymerization by the gelator to form a first polarization layer.

DETAILED DESCRIPTION OF THE EXEMPLARY EMBODIMENTS

Figure 1A:
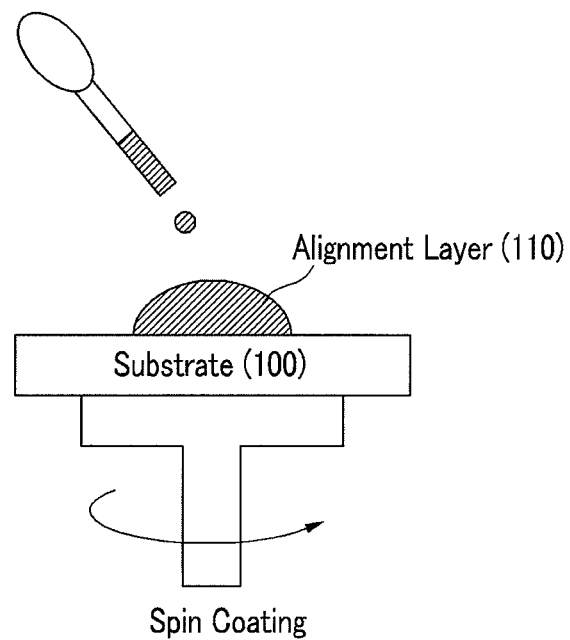
FIG. 1A to FIG. 1I are process perspective views showing a process for manufacturing a display device including an ICP an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1A to FIG. 1I show a process for manufacturing an ICP according to exemplary embodiments of the present invention, and a process for forming a polarization layer thereon by using one substrate is shown. Before forming the polarization layer, a liquid crystal panel including, for example, an amorphous silicon (a-Si) thin film transistor or a color filter may be formed on an insulation substrate. Exemplary embodiments of the present invention may realize the incell-POL (ICP) polarization layer after the process of forming the thin film transistor or color filter, and the position and the sequence of the formation of the polarization layer is not limited by an exemplary embodiment that will be described.

Exemplary Embodiment

Referring to FIG. 1A to FIG. 1I, the exemplary embodiment of the present invention will be described.

Figure 1B:
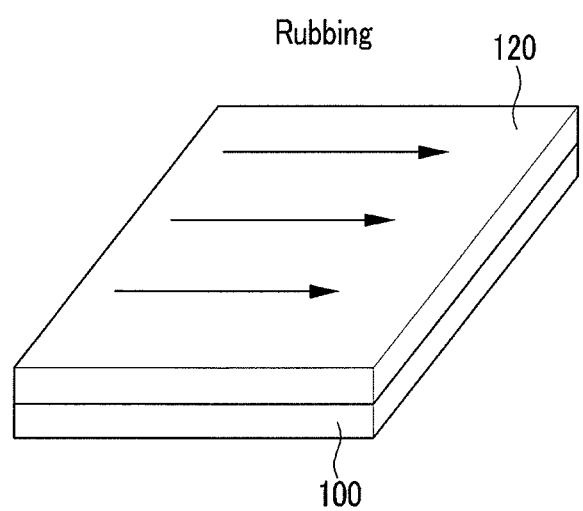
Figure 1C:
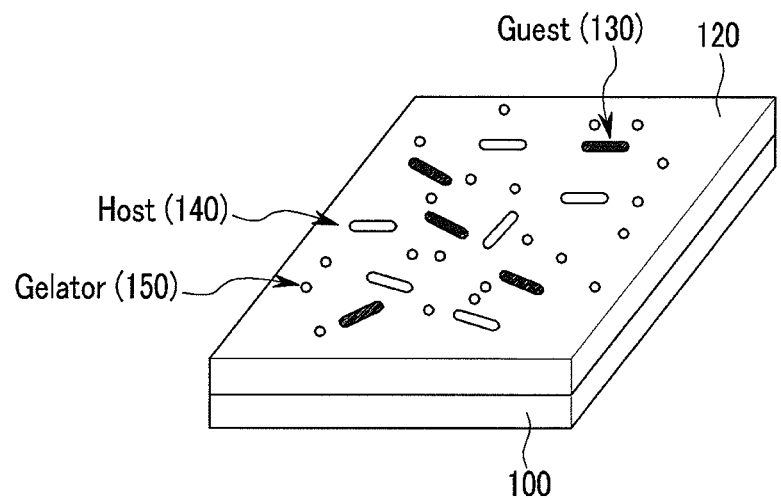
Figure 1D:
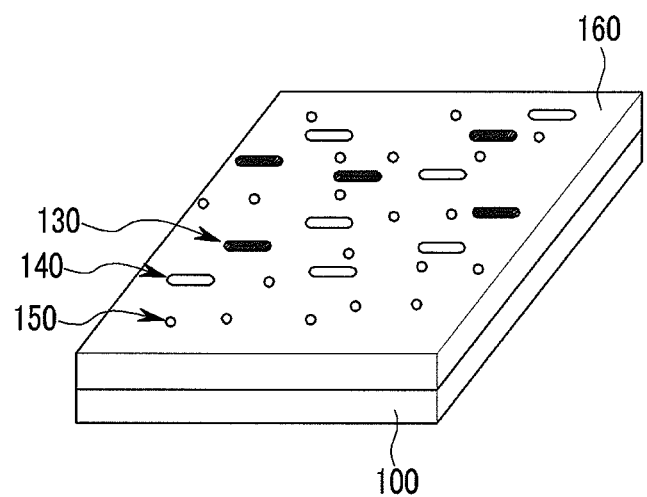
Figure 1E:
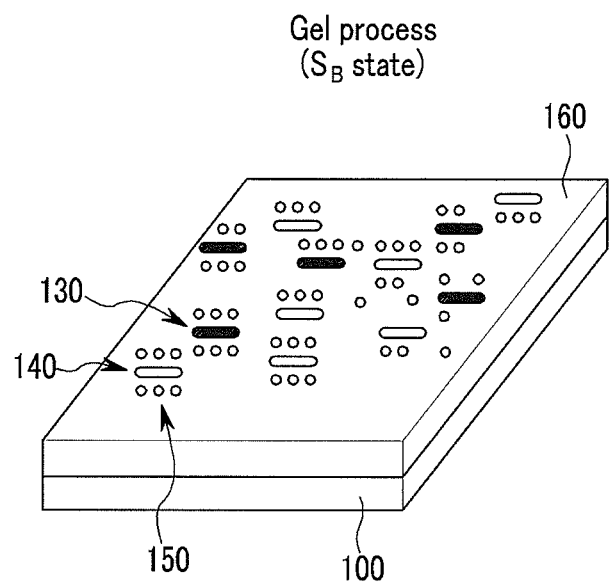
Figure 1F:
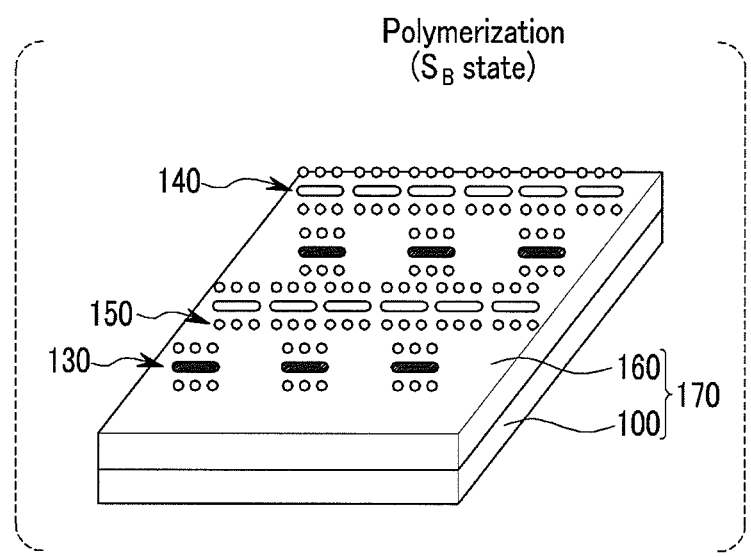
Figure 1G:
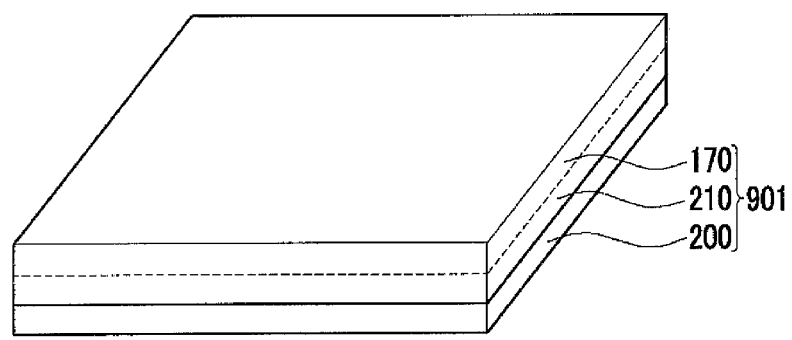
Figure 1H:
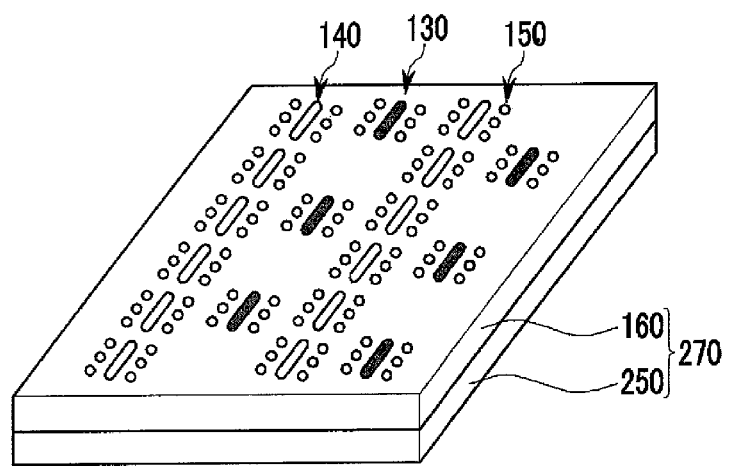
Figure 1I:
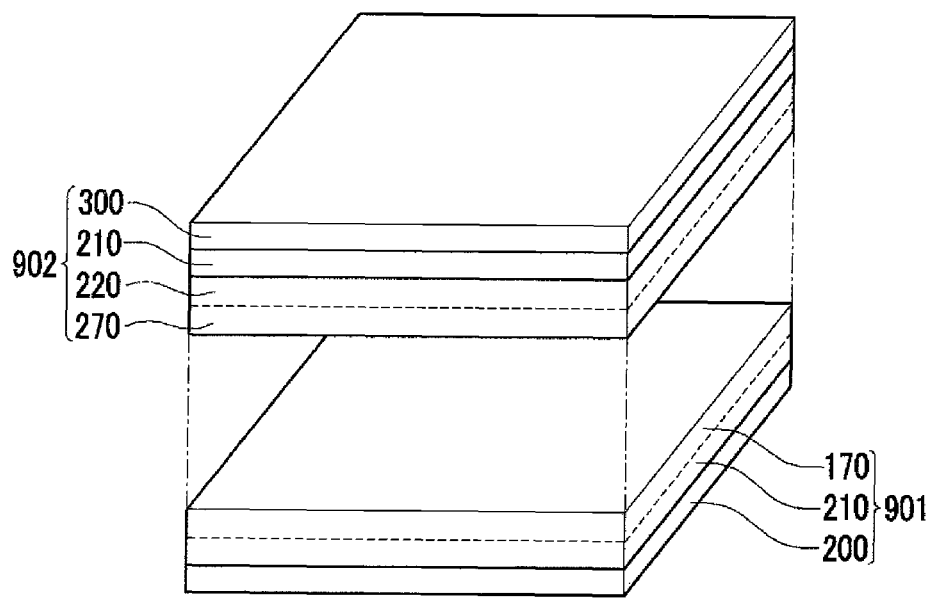
Figure 2:
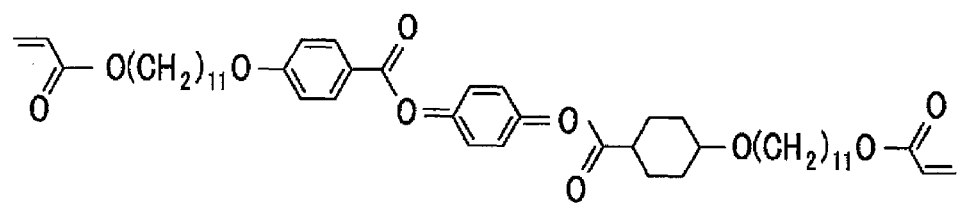
FIG. 2 is a view showing a chemical structure of a host liquid crystal used in the present invention.

FIG. 1A to FIG. 1I are process perspective views showing a process for manufacturing a display device 901 and a display device 902 each including an ICP of the exemplary embodiments of the present invention, and FIG. 2 is a view showing a chemical structure of a host liquid crystal used in the present invention.

As shown in FIG. 1A to FIG. 1G, the display device 901 includes a thin film transistor 210 formed on an insulation substrate 200, and a first polarization layer 170 formed on the thin film transistor 210. Here, the first polarization layer 170 includes a first substrate 100 and a first alignment layer 120 formed on the first substrate 100, and a liquid crystal mixture 160 formed on the first substrate 100 and the first alignment layer 120 that is made of dye 130 as a guest, a liquid crystal 140 as a host, and a gelator 150.

The first alignment layer 120 is a polyimide-based photo-aligning agent including a photo-reactive group.

The pre-tilt of the photo-alignment layer may be formed by light irradiation such as, for example, with ultraviolet rays.

Here, the angle of the pre-tilt may be formed by inclining the light irradiation.

Also, the energy and the irradiation time of the light irradiation may serve to control the angle of the pre-tilt.

A planalization agent may be formed on the polarization layer including the photo-alignment layer that is formed as described above.

The polarization layer may be formed on a different substrate after forming the thin film transistor on the insulation substrate.

Also, the ICP polarization layer may be formed after forming the color filter on the thin film transistor.

When the polarization layer is referred to as the first polarization layer 170, the second polarization layer 270 may be formed with the incell-POL (ICP) through the same process as the first polarization layer 170 at the upper side corresponding to the first polarization layer 170 after forming the color filter 220 on the second insulation substrate 300.

The formation of the second polarization layer 270 will be descried in detail.

As shown in FIG. 1I, the second substrate 250 of the second polarization layer 270 is formed on the color filter 220 that is formed on the second insulation substrate 300.

The second alignment layer is formed on the second substrate 250, and then the second polarization layer 270 is formed on the second alignment layer. The second polarization layer 270 includes the dichroic pigment 130 and the photo-hardener, the liquid crystal 140 as the host, and the cross-linked liquid crystal mixture 160 and the gelator 150 to be polymerized in the predetermined arrangement.

Also, the second polarization layer 270 may be formed on the outer of general insulation substrate by using the conventional PVA polarizer without the usage of the incell-POL.

The first incell-POL polarization layer 170 formed on the thin film transistor 210 and the second incell-POL polarization layer 270 formed on the color filter 220 are assembled to each other, and then the liquid crystal is injected therebetween to form the incell-POL liquid crystal display.

When describing detailed elements having the first polarization layer 170 according to the exemplary embodiment of the present invention, as shown in FIG. 1A, a photo-aligning agent 110 is coated on the substrate 100, and, as shown in FIG. 1B, ultraviolet rays are irradiated at an angle to thereby form the alignment layer 120.

As shown in FIG. 1C, the dichroic dye 130, the liquid crystal 140 as the host, and the photo-initiator and the gelator 150 are coated on the alignment layer 120 having the pre-tilt angle formed by the inclination irradiation.

Here, the dichroic dye and the liquid crystal host are arranged according to the pre-tilt of the alignment layer, and as shown in FIG. 1D, if the temperature of the liquid crystal host is increased to about 120 to about 130 degrees Celsius and then decreased to near room temperature, the liquid crystal 140 of the host may be changed into a smectic liquid crystal such that the predetermined arrangement is maintained at room temperature. Here, as shown in FIG. 1E, the gelator added to the liquid crystal mixture is solidified according to the change of the temperature, and the liquid crystal mixture is also polymerized together to be flat.

That is, as shown in FIG. 1F, the liquid crystal mixture 160 that is polymerized on the substrate 100 is solidified in a uniform arrangement thereby forming the first polarization layer 170. Further, as shown in FIG. 1H the liquid crystal mixture 160 polymerized on the second substrate 250 is also solidified in a uniform arrangement thereby forming the second polarization layer 270.

Also, as shown in FIG. 1G, the incell-POL may be sequentially formed by forming the polarization layer 170 after forming the thin film transistor and the color filter on the insulation substrate 200.

Also, the ICP polarization layers that are formed through the above-described process are disposed upwardly and downwardly, spacers are formed at predetermined intervals therebetween, and the liquid crystal is inserted or dripped to thereby assemble the ICP polarization layers such that the ICP liquid crystal display may be readily manufactured with good polarization efficiency and a relatively simple manufacturing process.

The liquid crystal 140 as the host that is used in the present invention has a chemical structure of a diacrylate reactive mesogen (RM) as shown in FIG. 2. However, the liquid crystal material is not limited thereto, and may include all smectic liquid crystals satisfying the present invention.

Another Exemplary Embodiment

The first polarization layer 170 is manufactured with the same method as the Exemplary Embodiment, however an aligning agent 110 that is not a photo-aligning agent is formed by roll-printing an inorganic alignment layer such as, for example, SiOx or diamond-like carbon (DIC) or depositing it in a vacuum chamber on the substrate 100, and the formed inorganic alignment layer is subjected to, for example, ion beam irradiation or plasma alignment to thereby form the pre-tilt of the alignment layer.

Also, for Another Exemplary Embodiment, the second polarization layer 270 may be formed with the same process as the first polarization layer 170.

Figure 3:
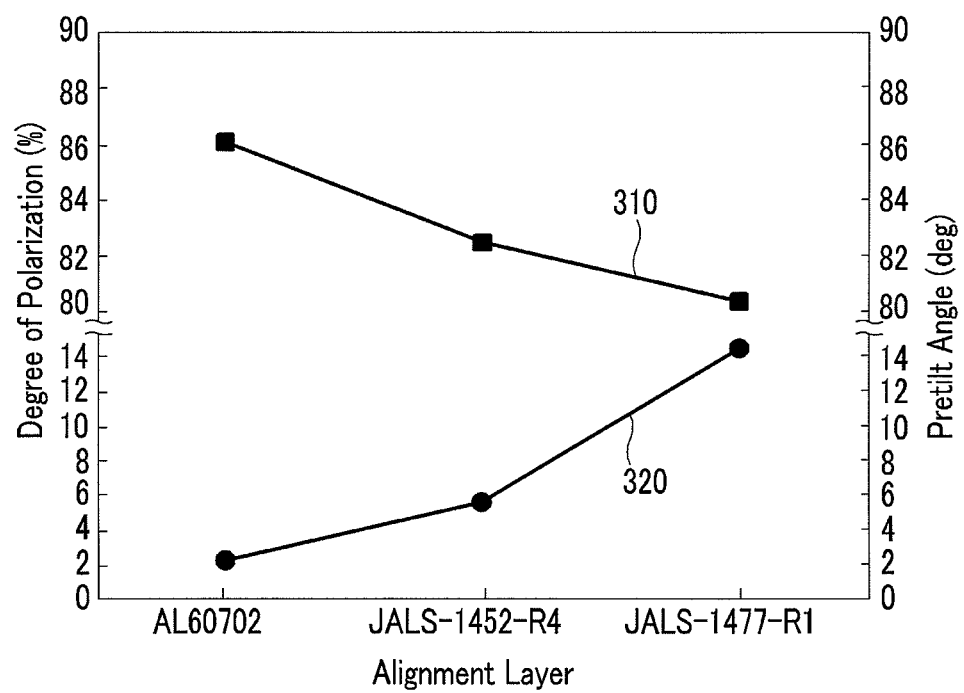
FIG. 3 is a graph showing a relationship between a polarizer and a pre-tilt according to an exemplary embodiment of the present invention.

FIG. 3 is a graph showing a relationship of the pre-tilt angle 320 formed in the first alignment layer 120 of the first polarization layer of the present invention, and the polarization efficiency 310 according to the pre-tilt angle. Referring to the graph in detail, when the pre-tilt angle 320 is about 6 degrees, the polarization efficiency 310 thereof is about 82%, and when the pre-tilt angle 320 is about 2 degrees, the polarization efficiency 310 thereof is about 86%. The photo-alignment of the exemplary embodiment and the ion beam or plasma alignment for the inorganic alignment layer of another exemplary embodiment are applied for the pre-tilt angle to be less than about 2 degrees such that the polarization efficiency may be increased.

Figure 4:
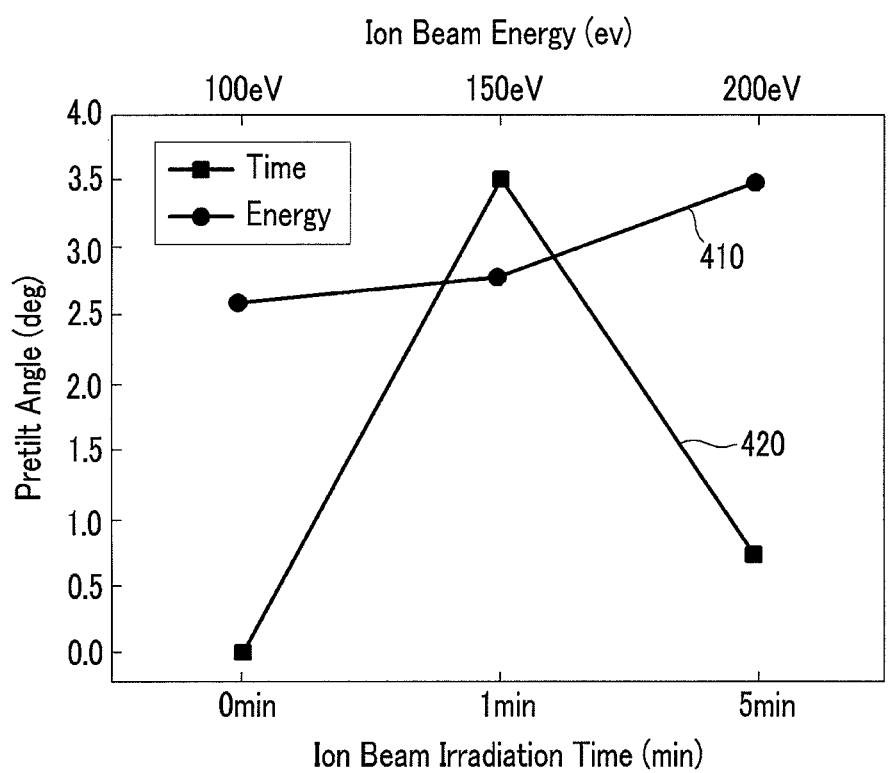
FIG. 4 is a graph showing a relationship between energy intensity and irradiation time of an ion beam according to another exemplary embodiment of the present invention.

Also, FIG. 4 is a graph showing an experimental result of energy of an ion beam and irradiation time of the beam for a pre-tilt angle of an alignment layer when using the inorganic alignment layer of another exemplary embodiment.

The pre-tilt is decreased as the energy 410 of the ion beam is decreased, and for example, it may be confirmed that a pre-tilt angle of less than about 2.5 degrees is formed under energy of less than about 100 eV.

When the irradiation time 420 of the ion beam is in the range of about 3 to about 5 minutes, a pre-tilt angle of less than about 2 degrees is formed.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method for manufacturing a liquid crystal display, comprising:
   providing a first insulation substrate;
   forming a thin film transistor on the first insulation substrate;
   forming a first substrate on the thin film transistor;
   forming a first alignment layer on the first substrate;
   coating a dichroic pigment, a liquid crystal mixture, a photo-initiator, and a gelator on the first alignment layer;
   sequentially applying a high temperature and a low temperature to the liquid crystal mixture to arrange the liquid crystal on the first alignment layer; and
   solidifying the arranged liquid crystal mixture through polymerization by the gelator to form a first polarization layer.

2. The method of claim 1, wherein
   the high temperature for the liquid crystal mixture is in the range of about 120 to about 130° C., and the low temperature is near room temperature.

3. The method of claim 2, further comprising:
   providing a second insulation substrate corresponding to the first insulation substrate;
   forming a second substrate on the second insulation substrate;
   forming a second alignment layer on the second substrate;
   coating a dichroic pigment, a liquid crystal mixture, a photo-initiator, and a gelator on the second alignment layer;
   sequentially applying a high temperature and a low temperature to the liquid crystal mixture to arrange the liquid crystal on the second alignment layer; and
   solidifying the arranged liquid crystal mixture through polymerization by the gelator to form a second polarization layer.

4. The method of claim 3, further comprising
   forming a color filter on the thin film transistor or the second insulation substrate.

5. The method of claim 4, wherein
   an alignment direction of the first alignment layer and an alignment direction of the second alignment layer are perpendicular to each other.

6. The method of claim 4, further comprising
   forming a pre-tilt on the first and second alignment layers.

7. The method of claim 6, wherein
   the pre-tilt of the first and second alignment layers is formed by one of ion beam irradiation, plasma arrangement, and photo-alignment.

8. The method of claim 7, wherein
   the pre-tilt of the first and second alignment layers by the ion beam irradiation is formed with irradiation energy of less than about 100 eV.

9. The method of claim 8, wherein
   the first and second alignment layers are formed by one of spin coating, imprinting, and Inkjet printing.

10. A liquid crystal display comprising:
    a first insulation substrate;
    a thin film transistor formed on the first insulation substrate;
    a first substrate formed on the thin film transistor;
    a first alignment layer formed on the first substrate; and
    a first polarization layer formed on the first alignment layer, the first polarization layer including a dichroic pigment and a photo-hardener, and a cross-linked liquid crystal mixture and a gelator polymerized in a predetermined arrangement,
    wherein a pre-tilt angle of the first alignment layer is less than about 2 degrees.

11. The liquid crystal display of claim 10, wherein
    the dichroic pigment is a dichroic dye.

12. The liquid crystal display of claim 11 wherein
    the liquid crystal mixture is a diacrylate reactive mesongen (RM) as shown in Chemical Formula 1;

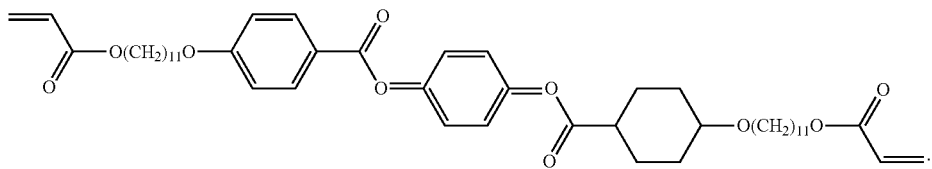

13. The liquid crystal display of claim 12, further comprising:
a second insulation substrate corresponding to the first insulation substrate;
a second substrate formed on the second insulation substrate;
a second alignment layer formed on the second substrate; and
a second polarization layer formed on the second alignment layer, the second polarization layer including a dichroic pigment and a photo-hardener, and a cross-linked liquid crystal mixture and a gelator polymerized in a predetermined arrangement.

14. The liquid crystal display of claim 13, wherein an alignment direction of the first alignment layer and an alignment direction of the second alignment layer are perpendicular to each other.

15. The liquid crystal display of claim 14, further comprising
a color filter formed on the thin film transistor or the second substrate.

16. The liquid crystal display of claim 15, wherein a pre-tilt angle of the second alignment layer is less than about 2 degrees.

17. The liquid crystal display of claim 16, wherein the first and second alignment layers are at least one of diamond-like carbon (DLC), SiOx, and a photo-alignment layer.

18. A method for manufacturing a liquid crystal display, comprising:
providing a first insulation substrate;
forming one of a thin film transistor and a color filter on the first insulation substrate;
forming a first substrate on the one of the thin film transistor and the color filter formed on the first insulation substrate;
forming a first alignment layer on the first substrate;
coating a dichroic pigment, a liquid crystal mixture, a photo-initiator, and a gelator on the first alignment layer;
applying a high temperature and a low temperature to the liquid crystal mixture to arrange the liquid crystal on the first alignment layer; and
solidifying the arranged liquid crystal mixture through polymerization by the gelator to form a first polarization layer.

19. The method of claim 18, further comprising:
providing a second insulation substrate corresponding to the first insulation substrate;
forming the other of the thin film transistor and the color filter on the second insulation substrate;
forming a second substrate on the thin film transistor and the color filter formed on the second insulation substrate;
forming a second alignment layer on the second substrate;
coating a dichroic pigment, a liquid crystal mixture, a photo-initiator, and a gelator on the second alignment layer;
applying a high temperature and a low temperature to the liquid crystal mixture to arrange the liquid crystal on the second alignment layer; and
solidifying the arranged liquid crystal mixture through polymerization by the gelator to form a second polarization layer.

20. The method of claim 19, wherein the thin film transistor is formed on the first insulation substrate and the first substrate is formed on the thin film transistor and wherein the color filter is formed on the second insulation substrate and the second substrate is formed on the color filter.

* * * * *